(12) United States Patent
Xu

(10) Patent No.: US 9,467,508 B2
(45) Date of Patent: Oct. 11, 2016

(54) METHOD AND SYSTEM FOR SENDING TRIGGER MESSAGE TO MTC UE, AND MTC UE

(75) Inventor: Hui Xu, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 220 days.

(21) Appl. No.: 14/350,158

(22) PCT Filed: Mar. 30, 2012

(86) PCT No.: PCT/CN2012/073344
§ 371 (c)(1),
(2), (4) Date: Apr. 7, 2014

(87) PCT Pub. No.: WO2013/113186
PCT Pub. Date: Aug. 8, 2013

(65) Prior Publication Data
US 2014/0317195 A1    Oct. 23, 2014

(30) Foreign Application Priority Data
Feb. 3, 2012 (CN) .......................... 2012 1 0024564

(51) Int. Cl.
*H04L 29/08* (2006.01)
*H04W 60/04* (2009.01)
(Continued)

(52) U.S. Cl.
CPC ............ *H04L 67/104* (2013.01); *H04W 4/005* (2013.01); *H04W 4/06* (2013.01); *H04W 4/14* (2013.01); *H04W 28/0215* (2013.01); *H04W 60/04* (2013.01)

(58) Field of Classification Search
CPC ........... H04W 4/005; H04W 28/0247; H04W 88/16; H04W 28/0289; H04W 4/14; H04W 28/0215; H04W 4/06; H04W 60/04
See application file for complete search history.

(56) References Cited

U.S. PATENT DOCUMENTS

2008/0153521 A1   6/2008  Benaouda
2014/0004857 A1*  1/2014  Rune ..................... H04W 48/12
                                                  455/434

(Continued)

FOREIGN PATENT DOCUMENTS

| CN | 102118700 A | 7/2011 |
| CN | 102238477 A | 11/2011 |
| WO | 2011134394 A1 | 11/2011 |

OTHER PUBLICATIONS

Technical Specification Group Services and System Aspects, Nov. 2011.

(Continued)

*Primary Examiner* — Chirag R Patel
(74) *Attorney, Agent, or Firm* — Brundidge & Stanger, P.C.

(57) ABSTRACT

The disclosure discloses a method for sending trigger message to a Machine Type Communication (MTC) User Equipment (UE), including that: an MTC server sends the trigger message to an MTC InterWorking Function (MTC-IWF); the MTC-IWF packages the trigger message as a short message, and sends the short message to a serving node of the MTC UE via an interface T5; and after receiving the trigger message sent by the MTC-IWF via the short message, the serving node sends the MTC UE the trigger message via control signalling or a short message. The disclosure further discloses a system for sending the trigger message, and an MTC UE. With the disclosure, the trigger message can be sent to the MTC UE via an interface T5.

19 Claims, 4 Drawing Sheets

(51) Int. Cl.
*H04W 4/06* (2009.01)
*H04W 28/02* (2009.01)
*H04W 4/00* (2009.01)
*H04W 4/14* (2009.01)

(56) References Cited

U.S. PATENT DOCUMENTS

2014/0073367 A1* 3/2014 Chou .................. H04W 4/005 455/466
2014/0219182 A1* 8/2014 Chandramouli ...... H04W 4/005 370/328

OTHER PUBLICATIONS

Device Trigger security, Jan. 30, 2012.
International Search Report in international application No. PCT/CN2012/073344, mailed on Nov. 15, 2012.
English Translation of the Written Opinion of the International Search Authority in international application No. PCT/CN2012/073344, mailed on Nov. 15, 2012.
Supplementary European Search Report in European application No. 12867127.8, mailed on Mar. 17, 2015.
Huawei, et al, Internal Identifier and External Identifier, 3GPP Draft; S2-112896_E-mail-Rev1_S2-112870, 3rd Generation Partnership Project, Mobile Competence Centre, vol. SA WG2, May 27, 2011.
3rd Generation Partnership Project; Technical Specification Group Services and SystemSystem Improvements for Machine-Type Communications; 3GPP Standard; 3GPP TR 23.888 3rd Generation Partnership Project, Mobile Competence Centre, vol. SA WG2, No. V1.5.0, , Oct. 19, 2011.
Acision: "Device Triggering with S&F for T5 and identifiers for originator" vol. SA WG2, No. Vancouver, CA Feb. 6, 2012-Feb. 10, 2012, Jan. 31, 2012.
International Search Report issued in corresponding application No. PCT/CN2012/073344 on Mar. 30, 2012.
International Publication issued in corresponding application No. PCT/CN2012/073344 on Aug. 8, 2013.
3GPP TS 23.682 V0.1.0, Technical Specification Group Services and System Aspects; Architecture Enhancements to facilitate communications with Packet Data Networks and Applications (Release 11), 3GPP, Nov. 2011 See sections 4.2-4.6, annex A2, figure A.2-1.
3GPP TSG SA WG3 (Security) Meeting #66, S3-120178, Device Trigger security, Ericsson et al., Jan. 30, 2012 (issue time in online database) See section 1,2.

* cited by examiner

METHOD AND SYSTEM FOR SENDING TRIGGER MESSAGE TO MTC UE, AND MTC UE

TECHNICAL FIELD

The disclosure relates to the field of radio communication technology, and in particular to a method and system for sending trigger message to a Machine Type Communication (MTC) User Equipment (UE), as well as an MTC UE.

BACKGROUND

Machine to Machine (M2M) technology refers to any technique or method of establishing a connection among machines. The concept of M2M has appeared in the 1990s, remaining a theory, however. After the year 2000, development of mobile communication technology allows possibility of implementing machine networking by mobile communication technology. An M2M service has appeared in the market around 2002, developed rapidly in a few years thereafter, and become the focus of attention of numerous communication equipments suppliers and telecom operators. Globally, at present, the number of machines is much larger than the population, so a promising market of the M2M technology may be expected.

Study on a scenario where M2M communication applies indicates a potential market of providing M2M communication on a mobile network. However, as the M2M service raises many new requirements on a system, in order to increase the competitiveness of a mobile network in this respect, an existing mobile network has to be optimized to support M2M communication more effectively.

The existing mobile communication network is designed mainly for communication among people, and is not optimized with respect to communication among machines and communication between a machine and a human. Another key for successful layout of M2M communication is the ability of an operator to provide a service of M2M communication at a lower cost.

In view of this, it is necessary to research on a solution to supporting M2M communication by a mobile network. The solution should maximize reuse of an existing network, and reduce impact of massive M2M communication on the network as well as complexity in operation maintenance.

Presently, there is an increasing competition in a telecommunication market, with decreasing rate and profit margin of the operator. A communication market based on people is going saturated, while the M2M is a brand-new opportunity for an operator.

To utilize a mobile network resource effectively, a 3rd Generation Partnership Project (3GPP) proposes a service of Machine Type Communication (MTC) including M2M communication and Machine-to-Man communication, the scope of which service goes far beyond H2H (Human to Human) communication. MTC differs completely from the existing H2H communication in aspects such as access control, billing, security, Quality of Service (QoS), a service mode.

A 3GPP Evolved Packet System (EPS) includes a core and a radio access network, such as a UMTS Universal Terrestrial Radio Access Network (UTRAN), an Evolved UTRAN (E-UTRAN), a GSM/EDGE Radio Access Network (GERAN). An Evolved Packet Core (EPC) includes network elements such as a Mobility Management Entity (MME), a Serving Gateway (SGW), a Packet Data Network (PDN) Gateway (PGW). A GPRS core includes network elements such as a Serving GPRS Support Node (SGSN). The E-UTRAN includes an evolved Node B (eNB).

A basic requirement to an MTC system is to trigger an MTC UE (i.e., a UE serving for MTC), a focus thereof being as follows. In order to control communication of an MTC UE, a possible way to communicate is to initiate a poll by an MTC server. For communication initiated by an MTC UE, sometimes the MTC server is required to poll MTC UEs for data. If query by the MTC server fails or an IP address of an MTC UE is not available, then the MTC server may establish communication with the MTC UE by triggering the MTC UE. If a network fails to trigger an MTC UE, then the network reports to the MTC server the failure to trigger the MTC UE. MTC-UE triggering is implemented via control-plane signalling in 3GPP.

MTC-UE triggering includes Mobile Originated (MO) and Mobile Terminating (MT) services, i.e., sending or receiving information by an MTC UE.

To implement effective transmission of the trigger message, solutions proposed include sending the trigger message via a Short Message Service (SMS), via control-plane signalling, or via user-plane data. For the sending the trigger message via control-plane signalling, an MTC server sends control-plane signalling including the trigger message to an MTC InterWorking Function (MTC-IWF); the MTC-IWF selects to send the trigger message to the MTC UE through an interface T5 or T4. For the sending the trigger message via user-plane data, the MTC server sends the trigger message to the MTC-IWF; the MTC-IWF acquires an IP address of the MTC UE and sends the trigger message to the MTC UE via a user plane.

MTC architecture in 3GPP is as shown in FIG. 1, wherein on a user plane, an application on an MTC UE communicates with an MTC server via an interface API, or communicates directly with a PGW/Gateway GPRS Support Node (GGSN) in a 3GPP network via an interface Gi/SGi; the MTC server communicates with the GGSN/PGW via the interface Gi/SGi; the GGSN/PGW communicates with the MTC UE via a Radio Access Network (RAN); on a control plane, the MTC server sends control-plane signalling including trigger message to an MTC-IWF via an interface Tsp; the MTC-IWF sends the control-plane signalling to at least one of an MME, an SGSN, and a Mobile Switching Center (MSC), or to a Short Message Service Center (SMSC), and then the control-plane signalling is sent to the MTC UE via the RAN.

FIG. 2 is a schematic diagram showing that an MTC server sends the trigger message on an interface T5 via an MTC-IWF, wherein the MTC server sends control-plane signalling including the trigger message directly to the MTC-IWF via an interface Tsp; the MTC-IWF sends the trigger message to MME/SGSN/MSC via the interface T5, and then the trigger message is further sent to the MTC UE.

After receiving the trigger message, the MTC UE may communicate with the MTC server as indicated by the trigger message, such as establish a user-plane bearer, or communicate with the MTC server via an SMS.

Study and practice of related art shows that when an MTC-IWF selects to send the trigger message via an interface T5, it is not specified how the trigger message is packaged at the interface T5, and how the trigger message is sent to the MTC UE after an MME and/or SGSN and/or MSC receives the trigger message.

SUMMARY

In view of the above, it is desired that embodiments of the disclosure provide a method and system for sending trigger message to an MTC UE as well as an MTC UE, thereby establishing a way of sending the trigger message via an interface T5.

Accordingly, a technical solution of an embodiment of the disclosure is implemented as follows.

An embodiment of the disclosure provides a method for sending trigger message to a Machine Type Communication (MTC) User Equipment (UE), including steps of:

sending, by an MTC server, the trigger message to an MTC InterWorking Function (MTC-IWF);

packaging, by the MTC-IWF, the trigger message as a short message, and sending, by the MTC-IWF, the short message to a serving node of the MTC UE via an interface T5; and after receiving the trigger message sent by the MTC-IWF via the short message, sending, by the serving node, the trigger message to the MTC UE via control signalling or a short message.

In an embodiment, the trigger message sent by the MTC server may include at least an application ID and an external identifier of the MTC UE.

In an embodiment, the method may further include the step(s) of: after the MTC-IWF receives the trigger message, authenticating, by the MTC-IWF, identity of the MTC server by determining the MTC server as an MTC server authorized to send the trigger message, and performing, by the MTC-IWF, load control on the trigger message sent by the MTC server.

In an embodiment, the step of packaging, by the MTC-IWF, the trigger message as a short message may include the step(s) of:

converting, by he MTC-IWF, content included in the trigger message into a corresponding field in the short message; extending, by he MTC-IWF, a field in the short message for indicating content of the short message, such that the extended field indicates that the short message contains the trigger message; and replacing, by he MTC-IWF, the external identifier of the MTC UE in the trigger message with an internal identifier of the MTC UE, wherein the MTC-IWF may obtain the internal identifier of the MTC UE by querying a Home Subscriber Server (HSS) according to the external identifier of the MTC UE.

In an embodiment, the step of sending, by the MTC-IWF, the short message to a serving node of the MTC UE via an interface T5 may include the step(s) of:

querying, by the MTC-IWF, the HSS for a T5 address of the serving node of the MTC UE according to the external identifier of the MTC UE, and sending, by the MTC-IWF, the short message to a serving node corresponding to the T5 address obtained by querying.

In an embodiment, the method may further include the step(s) of: when the MTC-IWF sends the short message to the serving node of the MTC UE, Not storing, by the MTC-IWF, the short message when the trigger message in the short message includes a field indicating single-time sending set by the MTC-IWF; or storing, by the MTC-IWF, the short message when the trigger message in the short message includes a field indicating sending within a validity period of time instead of the field indicating single-time sending.

In an embodiment, the method may further include a step of: when the MTC-IWF sends the short message to the serving node of the MTC UE, sending, by the MTC-IWF, the short message to the serving node in parallel or in series.

In an embodiment, the method may further include the step(s) of: after receiving the trigger message sent by the MTC-IWF via the short message, performing, by the serving node, load control on the trigger message sent by the MTC-IWF.

In an embodiment, the step of sending, by the serving node, the trigger message to the MTC UE via control signalling or a short message may include the step(s) of:

when the serving node determines that both the serving node and the MTC UE support a short message service, sending, by the serving node, the MTC UE the trigger message via the short message; otherwise when the serving node determines that not both the serving node and the MTC UE support a short message service, sending, by the serving node, the MTC UE the trigger message via the control signalling.

In an embodiment, the method may further include the step(s) of: when the serving node sends the MTC UE the trigger message via the short message, modifying, by the serving node, a destination address of the short message sent by the MTC-IWF to be the internal identifier of the MTC UE and then forwarding, by the serving node, the modified short message to the MTC UE.

In an embodiment, the method may further include the step(s) of: when the serving node sends the MTC UE the trigger message via the control signalling, extracting, by the serving node, the trigger message from the short message sent by the MTC-IWF, and sending the MTC UE the trigger message via the control signalling, wherein a destination address of the control signalling may be the internal identifier of the MTC UE, and the control signalling may be NAS signalling or dedicated control signalling.

In an embodiment, the serving node may include at least one of a Mobility Management Entity (MME), a Serving GPRS Support Node (SGSN), and a Mobile Switching Center (MSC).

In an embodiment, the method may further include the step(s) of: after the MTC UE receives the trigger message, reporting, by the MTC UE, to the MTC server via the serving node and the MTC-IWF that the trigger message is transferred; identifying, by the MTC UE, an application required to be triggered according to the application ID in the trigger message; and activating, by the MTC UE, the application to establish application-layer communication with the MTC server.

An embodiment of the disclosure further proposes a system for sending trigger message to a Machine Type Communication (MTC) User Equipment (UE), including an MTC server, an MTC UE, an MTC InterWorking Function (MTC-IWF), and a serving node of the MTC UE, wherein the MTC server is configured to send the MTC-IWF trigger message;

the MTC-IWF is configured to package the trigger message as a short message, and send the short message to the serving node via an interface T5;

the serving node is configured to: after receiving the trigger message sent by the MTC-IWF via the short message, send the MTC UE the trigger message via control signalling or a short message; and the MTC-UE is configured to receive the trigger message.

In an embodiment, the MTC-IWF may be further configured to: after receiving the trigger message, authenticate identity of the MTC server by determining the MTC server as an MTC server authorized to send the trigger message, and perform load control on the trigger message sent by the MTC server; and report to the MTC server that the trigger message is transferred after the MTC UE receives the trigger message.

In an embodiment, the MTC-IWF may be further configured to: convert content included in the trigger message into a corresponding field in the short message; extend a field in the short message for indicating content of the short message such that the extended field indicates that the short message contains the trigger message; obtain an internal identifier of the MTC UE; and replace the external identifier of the MTC UE in the trigger message with the internal identifier of the MTC UE.

In an embodiment, the MTC-IWF may be further configured to query a Home Subscriber Server (HSS) for a T5 address of the serving node according to the external identifier of the MTC UE, and send the short message to a serving node corresponding to the T5 address obtained by querying.

In an embodiment, the serving node may be further configured to: perform load control on the trigger message sent by the MTC-IWF; and report to the MTC-IWF that the trigger message is transferred after the MTC UE receives the trigger message.

In an embodiment, the serving node may be further configured to: when determining that both the serving node and the MTC UE support a short message service, send the MTC UE the trigger message via the short message; or when determining that not both the serving node and the MTC UE support a short message service, send the MTC UE the trigger message via the control signalling, wherein the control signalling may be NAS signalling or dedicated control signalling.

In an embodiment, the MTC UE may be further configured to: after receiving the trigger message, report to the MTC server via the serving node and the MTC-IWF that the trigger message is transferred; identify an application required to be triggered according to the application ID in the trigger message; and activate the application to establish application-layer communication with the MTC server.

An embodiment of the disclosure further provides a Machine Type Communication (MTC) User Equipment (UE), including a receiving unit, a sending unit and a setting unit, wherein the receiving unit is configured to receive trigger message sent by an MTC server via an MTC InterWorking Function (MTC-IWF) and a serving node;

the sending unit is configured to return a report reporting to the MTC server via the serving node and the MTC-IWF that the trigger message is transferred after the MTC UE receives the trigger message; and the setting unit is configured to set content of the report.

In an embodiment, the MTC UE may further include an application unit configured to establish application-layer communication with the MTC server.

In a method and system for sending the trigger message at an interface T5 according to an embodiment of the disclosure, after receiving trigger message sent by an MTC server, an MTC-IWF packages the trigger message as a short message, and sends the short message to an MME and/or SGSN and/or MSC via an interface T5; the MME and/or SGSN and/or MSC receiving the trigger message sends, via control signalling or a short message, the MTC UE the trigger message. Thus, the trigger message may be sent at an interface T5, and a signalling flow of the trigger message at the interface T5 is determined.

DETAILED DESCRIPTION

To facilitate description, in an embodiment of the disclosure, MTC-UE trigger message may also be referred to as trigger message for short.

Figure 3:
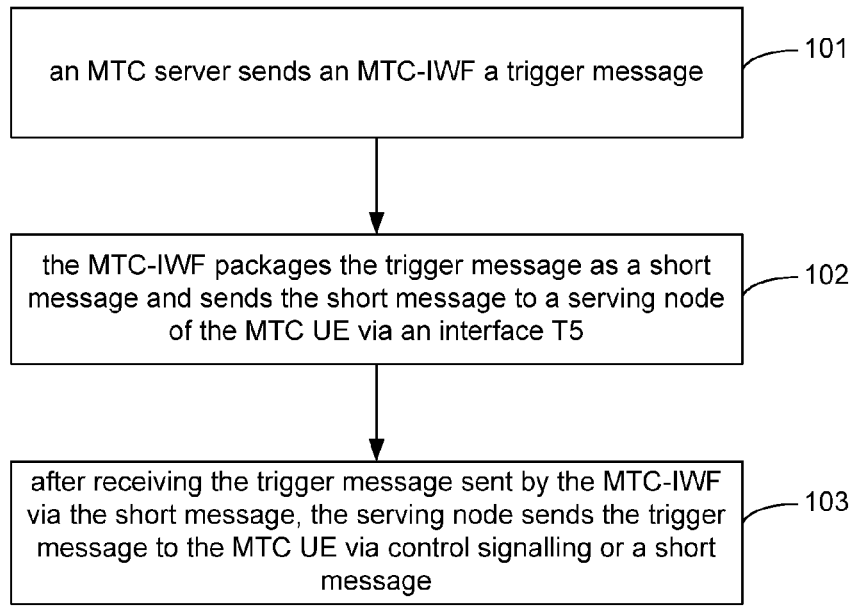
FIG. 3 is a flowchart of sending the trigger message via an interface T5 according to an embodiment of the disclosure.

A basic flow in sending the trigger message via an interface T5 according to an embodiment of the disclosure, as shown in FIG. 3, may include steps as follows.

step 101: an MTC server sends an MTC-IWF an MTC-UE trigger message including at least an application ID and an external identifier of the MTC UE.

Figure 1:
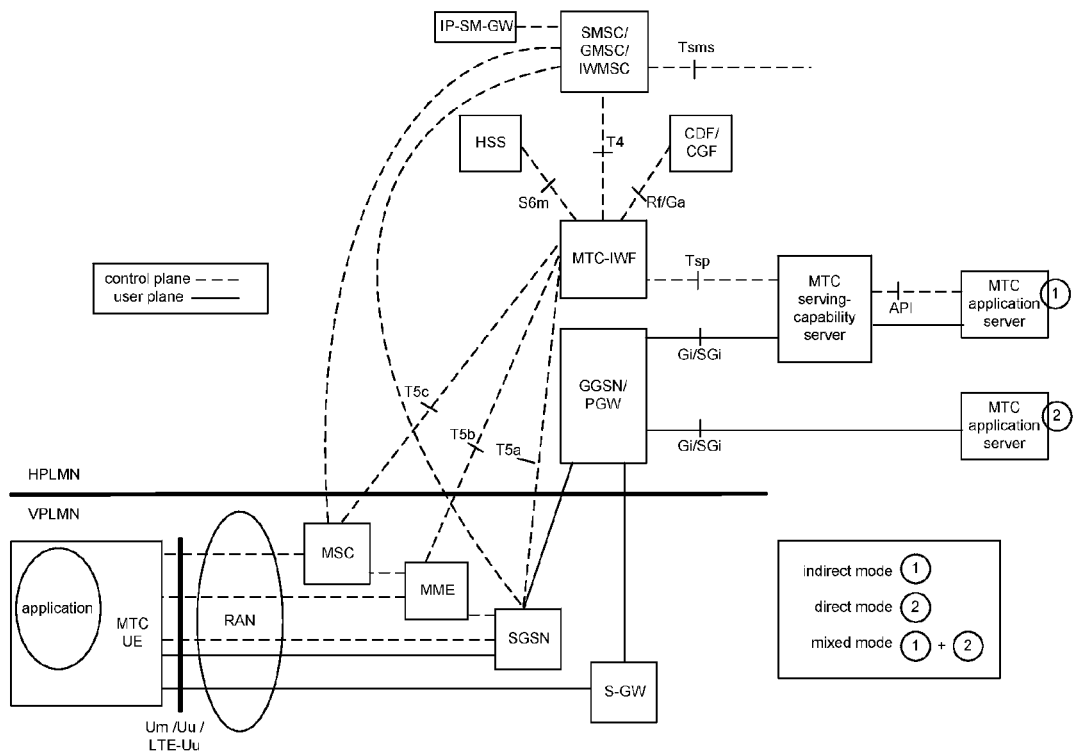
FIG. 1 is a schematic diagram of MTC architecture in existing 3GPP.
Figure 2:
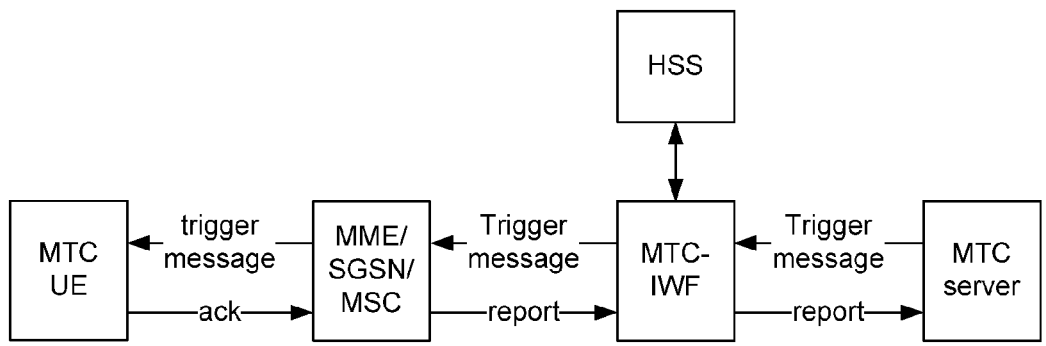
FIG. 2 is a schematic diagram of sending, by an MTC-IWF, the trigger message via an interface T5 in related art.

The MTC server in an embodiment of the disclosure may include an MTC serving-capability server and an MTC application server as shown in FIG. 1.

Step 102: the MTC-IWF packages the trigger message as a short message and sends the short message to a serving node of the MTC UE via an interface T5.

After receiving the trigger message, the MTC-IWF first authenticates identity of the MTC server sending the trigger message to determine that the MTC server is an MTC server authorized to send trigger message, and then the MTC-IWF performs load control on the trigger message sent by the MTC server to avoid network congestion or node overload.

The MTC-IWF may package the trigger message specifically by: converting content included in the trigger message into a corresponding field in the short message; extending a field in the short message for indicating content of the short message, such that the extended field indicates that the short message contains the trigger message; and replacing the external identifier of the MTC UE in the trigger message with an internal identifier of the MTC UE, wherein the MTC-IWF obtains the internal identifier of the MTC UE by querying a Home Subscriber Server (HSS) according to the external identifier of the MTC UE.

The MTC-IWF may send the short message to the serving node of the MTC UE via the interface T5 specifically by: querying the HSS for a T5 address of the serving node of the MTC UE according to the external identifier of the MTC UE, and sending the short message to a serving node corresponding to the T5 address obtained by querying.

When the short message is sent to the serving node of the MTC UE, if the trigger message in the short message includes a field indicating single-time sending set by the MTC-IWF, then the MTC-IWF does not store the short message, or if the trigger message in the short message includes a field indicating sending within a validity period of time instead of the field indicating single-time sending, then the MTC-IWF stores the short message. Wherein, the field indicating single-time sending indicates that the MTC-IWF will send the short message to the serving node for just once, while the field indicating sending within a validity period of time indicates that the MTC-IWF may send the short message to the serving node repeatedly within the validity period.

Alternatively, the MTC-IWF may send the short message to the serving node in parallel or in series.

Step 103: after receiving the trigger message sent by the MTC-IWF via the short message, the serving node sends the trigger message to the MTC UE via control signalling or a short message.

The serving node is required to perform load control on the trigger message sent by the MTC-IWF to avoid or relieve network congestion or node overload.

When determining that both the serving node and the MTC UE support a short message service, the serving node sends the MTC UE the trigger message via the short message; or when determining that not both the serving node and the MTC UE support a short message service, the serving node sends the MTC UE the trigger message via the control signalling.

When the trigger message is sent via SMS, the serving node modifies a destination address of the short message sent by the MTC-IWF to be the internal identifier of the MTC UE before forwarding the short message to the MTC UE.

When the trigger message is sent via control signalling, the serving node extracts the trigger message from the short message sent by the MTC-IWF, and sends the trigger message to the MTC UE via the control signalling, wherein a destination address of the control signalling is the external identifier of the MTC UE, and the control signalling is NAS signalling or dedicated control signalling.

After receiving the trigger message, the MTC UE identifies an application required to be triggered according to the application ID included in the trigger message, and activates the application to establish application-layer communication with the MTC server.

The serving node may include at least one of an MME, an SGSN, and an MSC.

Figure 4:
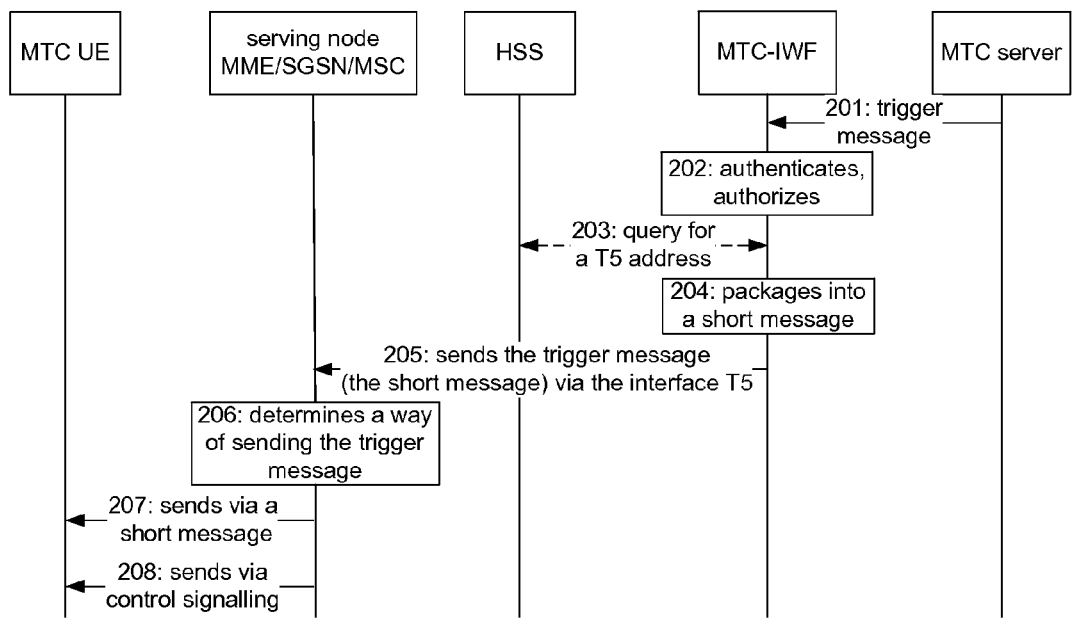
FIG. 4 is a schematic diagram of sending the trigger message via an interface T5 in an embodiment of the disclosure.

The aforementioned technical solutions are further elaborated with a specific embodiment, as shown in FIG. 4, as follows.

Step 201: an MTC server sends an MTC-UE trigger message to an MTC-IWF.

When the MTC server needs to trigger a certain MTC UE and establish application-layer communication with the MTC UE, the MTC server generates trigger message including at least an application ID and an external identifier (ext-ID) of the MTC UE, wherein the application ID is provided to the MTC UE for identifying an application required to be triggered; the MTC server queries a Domain Name System (DNS) for an IP address of the MTC-IWF according to the external identifier of the MTC UE.

The MTC server sends trigger message to the MTC-IWF via an interface Tsp.

Step 202: after receiving the trigger message, the MTC-IWF authenticates and authorizes the MTC server, and if the MTC server is valid, then the MTC-IWF accepts the trigger message, or if the MTC server is invalid, then the MTC-IWF discards the trigger message.

Step 203: the MTC-IWF queries for a T5 address of the serving node of the MTC UE.

The MTC-IWF queries an HSS for the T5 address of the serving node of the MTC UE according to the external identifier of the MTC UE, wherein the serving node includes at least one of an MME, an SGSN, and an MSC. The MTC-IWF may query for a T5 address of one or more of the MME, SGSN and MSC.

Step 204: the MTC-IWF sends the trigger message via an interface T5 and packages the trigger message as a short message.

The MTC-IWF converts, according to a short-message format specified in a protocol, content included in the trigger message into a corresponding field in the short message; in addition, there is a field indicating content of a short message in an existing short-message structure, this field is extended such that the extended field indicates that the short message contains the trigger message. When packaging the trigger message, the MTC-IWF has to replace the external identifier of the MTC UE included in the trigger message with an internal identifier of the MTC UE.

The MTC-IWF obtains the internal identifier of the MTC UE by querying the HSS according to the external identifier of the MTC UE.

A prerequisite for implementing the method of an embodiment of the disclosure is that the MTC-IWF sends the trigger message via the interface T5. In practice, the MTC-IWF further needs to decide whether to send the trigger message via the interface T5 according to a local policy and information obtained by querying the HSS, if the MTC-IWF decides not to send the trigger message via the interface T5, then the flow ends.

Wherein, the local policy may be for example a local network deployment, a type of a serving node of the MTC UE and a preferred solution of a local operator; the information obtained by querying the HSS may be for example the T5 address of the serving node of the MTC UE, the external identifier of the MTC UE (preferably an International Mobile Subscriber Identity (IMSI) of the MTC UE), and subscription information of the MTC UE, etc.

Step 205: the MTC-IWF sends the short message to a serving node (MME and/or SGSN and/or MSC) corresponding to the T5 address obtained by querying.

Wherein, the MTC-IWF sends the short message to the SGSN via an interface T5a, and/or sends the short message to the MME via an interface T5b, and/or sends the short message to the MSC via an interface T5c.

If it is specified in the trigger message that the trigger message is sent via the interface T5 for just once, then the MTC-IWF does not need to store the trigger message; or if it is not specified so, the MTC-IWF stores the trigger message, and specifically, the stored trigger message is the packaged short message, which is sent repeatedly.

Wherein, the MTC-IWF may set a field indicating single-time sending in the trigger message to indicate that the trigger message is sent via the interface T5 for just once; or the MTC-IWF may set in the trigger message a field indicating sending within a validity period of time, wherein within the validity period of time, the MTC-IWF sends the short message repeatedly until the MTC-IWF receives an acknowledgement indicating that the trigger message is sent successfully; after receiving the acknowledgement indicating that the trigger message is sent successfully, the MTC-IWF stops sending and deletes the short message.

The MTC-IWF may send the short message to the MME and/or SGSN and/or MSC in parallel or in series, depending specifically on a comprehensive measure by the MTC-IWF according to the local policy and the information obtained by querying the HSS.

Wherein, the local policy may be for example the local network deployment, the type of the serving node of the MTC UE and the preferred solution of the local operator, etc.;

The information obtained by querying the HSS may be for example the T5 address of the serving node of the MTC UE, the external identifier of the MTC UE (preferably, an IMSI of the MTC UE) and subscription information of the MTC UE, etc.

Step 206: when the serving node determines to send the trigger message via the short message, a step 207 is performed; or when the serving node determines to send the trigger message via the control signalling, a step 208 is performed.

When determining that both the serving node and the MTC UE support SMS according to the local policy and the subscription information of the MTC UE, the serving node determines to send the trigger message via a short message; or when determining that not both the serving node and the MTC UE support SMS, the serving node determines to send the trigger message via control signalling.

Wherein, the serving node sends the MTC-IWF a request for obtaining the subscription information of the MTC UE, and the MTC-IWF queries the HSS for the subscription information of the MTC UE and returns the subscription information to the serving node.

Figure 5:
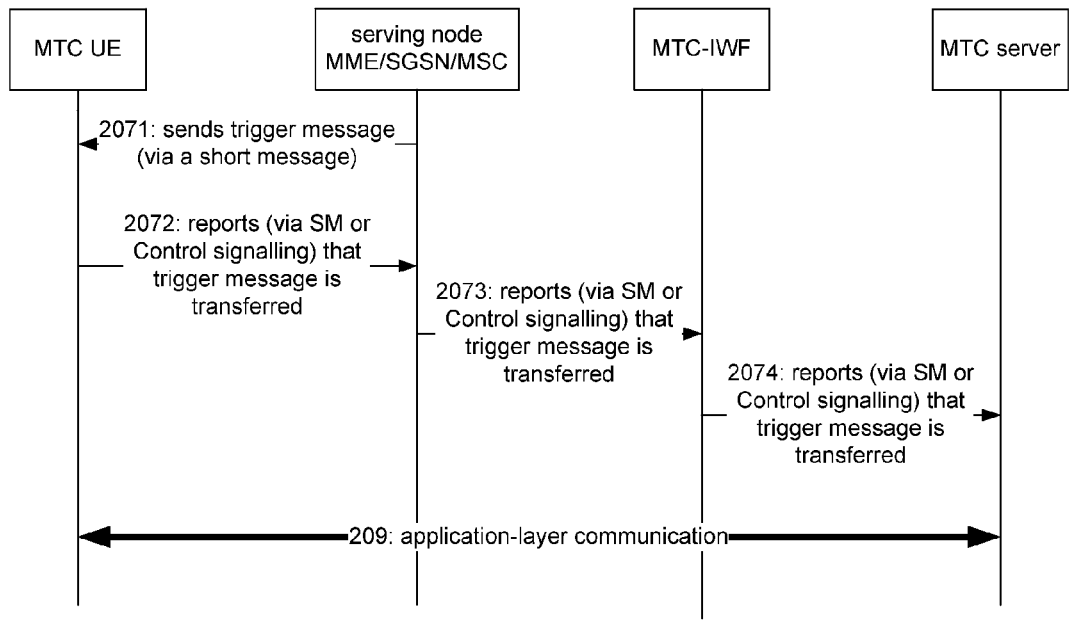
FIG. 5 is a schematic diagram of sending, by a serving node, the trigger message via a short message in an embodiment of the disclosure.

Step 207: the serving node sends the trigger message via a short message, as shown in FIG. 5, specifically by steps as follows.

Step 2071: the serving node modifies a destination address of the short message sent by the MTC-IWF from the T5 address to the internal identifier of the MTC UE before forwarding the short message to the MTC UE.

Step 2072: the MTC UE returns to the serving node a report reporting that the trigger message is transferred.

After receiving the sort message, the MTC UE extracts the trigger message from the short message, and returns to the serving node the report reporting that the trigger message is transferred, indicating that the MTC UE has received the trigger message, i.e., the trigger message is sent successfully.

Wherein, the report reporting that the trigger message is transferred may be born by a short message or by control signalling.

Alternatively, if the trigger message fails to be sent and does not include the field indicating single-time sending, then the serving node sets a message-awaiting identifier and waits for the MTC-IWF to resend the short message and then forward the short message to the MTC UE, until the serving node receives the report reporting that the trigger message is transferred returned by the MTC UE. Wherein, a cause for failure in sending the trigger message may be that: the serving node receives a failure acknowledgement sent by the MTC UE; or the validity period of time, as specified in the field indicating sending within a validity period of time, expires; or the serving node finds the MTC UE unreachable, etc.

Step 2073: the serving node sends the MTC-IWF the report reporting that the trigger message is transferred.

The serving node forwards to the MTC-IWF the report reporting that the trigger message is transferred which is sent by the MTC UE to indicate that the MTC UE has received the trigger message, i.e., the trigger message is sent successfully.

Step 2074: the MTC-IWF sends the MTC server the report reporting that the trigger message is transferred.

The MTC-IWF forwards to the MTC server the report reporting that the trigger message is transferred which is forwarded by the serving node to indicate that the trigger message is sent successfully, and then the flow goes to a step 209.

Figure 6:
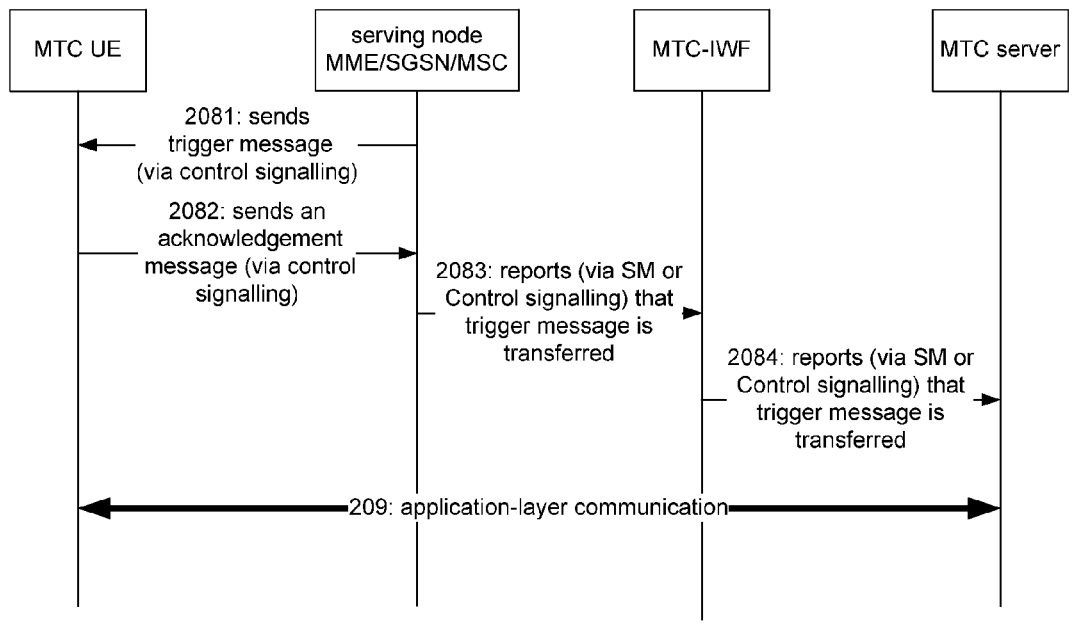
FIG. 6 is a schematic diagram of sending, by a serving node, the trigger message via control signalling in an embodiment of the disclosure.

Step 208: the serving node sends the trigger message via control signalling, as shown in FIG. 6, specifically by steps as follows.

Step 2081: the serving node extracts the trigger message from the short message and sends the trigger message to the MTC UE via the control signalling. Wherein, the control signalling may be NAS signalling or dedicated control signalling; and the destination address of the control signalling is the internal identifier of the MTC UE.

Step 2802: the MTC UE returns an acknowledgement message to the serving node.

After receiving the control signalling, the MTC UE extracts the trigger message from the control signalling, and returns the acknowledgement message to the serving node to indicate that the MTC UE has received the trigger message, i.e., the trigger message is sent successfully.

It has been indicated in the step 206 that when determining that both the serving node and the MTC UE support SMS, the serving node determines to send the trigger message via a short message; or when determining that not both the serving node and the MTC UE support SMS, the serving node determines to send the trigger message via control signalling. Therefore, the MTC UE here needs to return the acknowledgement message to the serving node via control signalling.

Furthermore, if the trigger message fails to be sent and does not include the field indicating single-time sending, then the serving node sets a message-awaiting identifier and waits for the MTC-IWF to resend the short message and then forward the short message to the MTC UE, until receiving the acknowledgement message returned by the MTC UE.

Step 2083: the serving node sends the MTC-IWF the report reporting that the trigger message is transferred.

After receiving the acknowledgement message sent by the MTC UE, the serving node generates the report reporting that the trigger message is transferred and sends the report to the MTC-IWF to indicate that the trigger message is sent successfully. The report reporting that the trigger message is transferred may be born on a short message or control signalling.

Step 2084: the MTC-IWF sends the MTC server the report reporting that the trigger message is transferred.

The MTC-IWF forwards to the MTC server the report reporting that the trigger message is transferred which is forwarded by the serving node to indicate that the trigger message is sent successfully, and then the flow goes to the step 209.

Step 209: the MTC UE establishes application-layer communication with the MTC server, then the flow ends.

The application-layer communication refers to that the MTC UE identifies an application required to be triggered according to the application ID included in the trigger message, and activates the application to communicate with the MTC server.

Figure 7:
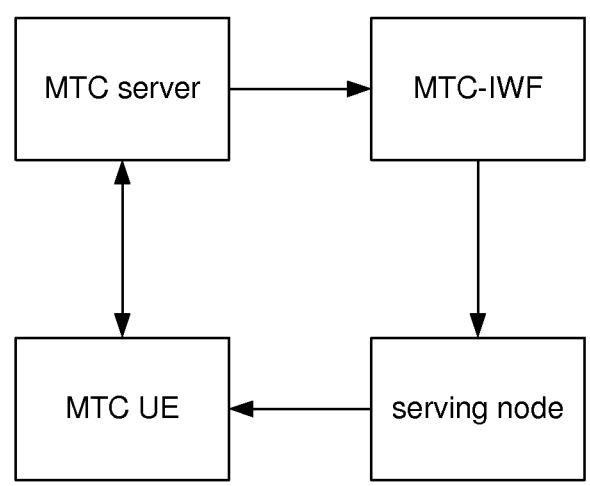
FIG. 7 is a schematic diagram of a structure of a system for sending the trigger message via an interface T5 according to an embodiment of the disclosure.

To implement an aforementioned method, the disclosure further provides a system, as shown in FIG. 7, including: an MTC server, an MTC UE, an MTC-IWF and a serving node of the MTC UE, wherein the MTC server is configured to send the MTC-IWF trigger message;

the MTC-IWF is configured to package the trigger message as a short message, and send the short message to the serving node via an interface T5;

the serving node is configured to: after receiving the trigger message sent by the MTC-IWF via the short message, send the MTC UE the trigger message via control signalling or a short message; and the MTC-UE is configured to receive the trigger message.

Wherein, the MTC-IWF is further configured to: after receiving the trigger message, authenticate identity of the MTC server by determining the MTC server as an MTC server authorized to send the trigger message, and perform load control on the trigger message sent by the MTC server; and report to the MTC server that the trigger message is transferred after the MTC UE receives the trigger message.

The MTC-IWF is further configured to: convert content included in the trigger message into a corresponding field in the short message; extend a field in the short message for indicating content of the short message such that the extended field indicates that the short message contains the trigger message; obtain an internal identifier of the MTC UE; and replace the external identifier of the MTC UE in the trigger message with the internal identifier of the MTC UE.

The MTC-IWF is further configured to query an HSS for a T5 address of the serving node according to the external identifier of the MTC UE, and send the short message to a serving node corresponding to the T5 address obtained by querying.

The serving node is further configured to: perform load control on the trigger message sent by the MTC-IWF; and report to the MTC-IWF that the trigger message is transferred after the MTC UE receives the trigger message.

The serving node is further configured to: when determining that both the serving node and the MTC UE support SMS, send the MTC UE the trigger message via the short message; or when determining that not both the serving node and the MTC UE support SMS, send the MTC UE the trigger message via the control signalling.

The control signalling may be NAS signalling or dedicated control signalling.

The MTC UE is further configured to: after receiving the trigger message, report to the MTC server via the serving node and the MTC-IWF that the trigger message is transferred; identify an application required to be triggered according to the application ID in the trigger message; and activate the application to establish application-layer communication with the MTC server.

An embodiment of the disclosure further provides an MTC UE including a receiving unit, a sending unit and a setting unit, wherein the receiving unit is configured to receive trigger message sent by an MTC server via an MTC-IWF and a serving node;

the sending unit is configured to return a report reporting to the MTC server via the serving node and the MTC-IWF that the trigger message is transferred after the MTC UE receives the trigger message; and the setting unit is configured to set content of the report reporting that the trigger message is transferred.

The MTC UE may further include an application unit configured to establish application-layer communication with the MTC server.

What described are merely embodiments of the disclosure, and are not intended to limit the scope of the disclosure.

The invention claimed is:

1. A method for sending trigger message to a Machine Type Communication (MTC) User Equipment (UE), comprising:
    sending, by an MTC server, the trigger message to an MTC InterWorking Function (MTC-IWF);
    packaging, by the MTC-IWF, the trigger message as a short message, and sending, by the MTC-IWF, the short message to a serving node of the MTC UE via an interface T5; and
    after receiving the trigger message sent by the MTC-IWF via the short message, sending, by the serving node, the trigger message to the MTC UE via control signalling or a short message,
    wherein the step of sending, by the serving node, the trigger message to the MTC UE via control signalling or a short message comprises:
    when the serving node determines that both the serving node and the MTC UE support a short message service, sending, by the serving node, the MTC UE the trigger message via the short message;
    otherwise when the serving node determines that not both the serving node and the MTC UE support a short message service, sending, by the serving node, the MTC UE the trigger message via the control signalling.

2. The method according to claim 1, wherein the trigger message sent by the MTC server comprises at least an application ID and an external identifier of the MTC UE.

3. The method according to claim 1, further comprising:
    after the MTC-IWF receives the trigger message, authenticating, by the MTC-IWF, identity of the MTC server by determining the MTC server as an MTC server authorized to send the trigger message, and performing, by the MTC-IWF, load control on the trigger message sent by the MTC server.

4. The method according to claim 2, wherein the step of packaging, by the MTC-IWF, the trigger message as a short message comprises:
    converting, by the MTC-IWF, content included in the trigger message into a corresponding field in the short message;
    extending, by the MTC-IWF, a field in the short message for indicating content of the short message, such that the extended field indicates that the short message contains the trigger message; and
    replacing, by the MTC-IWF, the external identifier of the MTC UE in the trigger message with an internal identifier of the MTC UE,
    wherein the MTC-IWF obtains the internal identifier of the MTC UE by querying a Home Subscriber Server (HSS) according to the external identifier of the MTC UE.

5. The method according to claim 1, further comprising:
    when the MTC-IWF sends the short message to the serving node of the MTC UE, not storing, by the MTC-IWF, the short message when the trigger message in the short message comprises a field indicating single-time sending set by the MTC-IWF; or storing, by the MTC-IWF, the short message when the trigger message in the short message comprises a field indicating sending within a validity period of time instead of the field indicating single-time sending.

6. The method according to claim 1, further comprising:
    when the MTC-IWF sends the short message to the serving node of the MTC UE, sending, by the MTC-IWF, the short message to the serving node in parallel or in series.

7. The method according to claim 1, further comprising:
    after receiving the trigger message sent by the MTC-IWF via the short message, performing, by the serving node, load control on the trigger message sent by the MTC-IWF.

8. The method according to claim 4, further comprising:
when the serving node sends the MTC UE the trigger message via the short message, modifying, by the serving node, a destination address of the short message sent by the MTC-IWF to be the internal identifier of the MTC UE and then forwarding, by the serving node, the modified short message to the MTC UE.

9. The method according to claim 4, further comprising:
when the serving node sends the MTC UE the trigger message via the control signaling,
extracting, by the serving node, the trigger message from the short message sent by the MTC-IWF, and sending the MTC UE the trigger message via the control signaling, wherein a destination address of the control signaling is the internal identifier of the MTC UE, and
wherein the control signaling is NAS signaling or dedicated control signaling.

10. The method according to claim 1, wherein the serving node comprises at least one of a Mobility Management Entity (MME), a Serving GPRS Support Node (SGSN), and a Mobile Switching Center (MSC).

11. The method according to claim 2, further comprising:
after the MTC UE receives the trigger message,
reporting, by the MTC UE, to the MTC server via the serving node and the MTC-IWF that the trigger message is transferred;
identifying, by the MTC UE, an application required to be triggered according to the application ID in the trigger message; and activating, by the MTC UE, the application to establish application-layer communication with the MTC server.

12. A system for sending trigger message to a Machine Type Communication (MTC) User Equipment (UE), comprising an MTC server, an MTC UE, an MTC InterWorking Function (MTC-IWF), and a serving node of the MTC UE,
wherein the MTC server is configured to send the MTC-IWF trigger message; the MTC-IWF is configured to package the trigger message as a short message, and send the short message to the serving node via an interface T5;
wherein the serving node is configured to:
after receiving the trigger message sent by the MTC-IWF via the short message, send the MTC UE the trigger message via control signaling or a short message;
wherein the MTC-UE is configured to receive the trigger message, and
wherein the serving node is further configured to:
when determining that both the serving node and the MTC UE support a short message service, send the MTC UE the trigger message via the short message; or when determining that not both the serving node and the MTC UE support a short message service, send the MTC UE the trigger message via the control signaling.

13. The system according to claim 12, wherein the MTC-IWF is further configured to:
after receiving the trigger message, authenticate identity of the MTC server by determining the MTC server as an MTC server authorized to send the trigger message, and perform load control on the trigger message sent by the MTC server; and report to the MTC server that the trigger message is transferred after the MTC UE receives the trigger message.

14. The system according to claim 12, wherein the MTC-IWF is further configured to:
convert content included in the trigger message into a corresponding field in the short message;
extend a field in the short message for indicating content of the short message such that the extended field indicates that the short message contains the trigger message; obtain an internal identifier of the MTC UE; and
replace the external identifier of the MTC UE in the trigger message with the internal identifier of the MTC UE.

15. The system according claim 12, wherein the serving node is further configured to:
perform load control on the trigger message sent by the MTC-IWF; and
report to the MTC-IWF that the trigger message is transferred after the MTC UE receives the trigger message.

16. The system according to claim 12, wherein the control signaling is NAS signaling or dedicated control signaling.

17. The system according to claim 12, wherein the MTC UE is further configured to:
after receiving the trigger message, report to the MTC server via the serving node and the MTC-IWF that the trigger message is transferred;
identify an application required to be triggered according to the application ID in the trigger message; and
activate the application to establish application-layer communication with the MTC server.

18. A Machine Type Communication (MTC) User Equipment (UE), comprising:
a receiving unit, a sending unit and a setting unit, wherein the receiving unit is configured to receive trigger message sent by an MTC server via an MTC InterWorking Function (MTC-IWF) and a serving node;
wherein the sending unit is configured to return a report reporting to the MTC server via the serving node and the MTC-IWF that the trigger message is transferred after the MTC UE receives the trigger message;
wherein the setting unit is configured to set content of the report, and
wherein when it is determined by the serving node that both the serving node and the MTC UE support a short message service, receiving, by the MTC UE, the trigger message sent by the serving node via the short message;
otherwise when it is determined by the serving node that not both the serving node and the MTC UE support a short message service, receiving, by the MTC UE, the trigger message sent by the serving node via the control signaling.

19. The MTC UE according to claim 18, further comprising:
an application unit configured to establish application-layer communication with the MTC server.

* * * * *